(12) United States Patent
Park et al.

(10) Patent No.: US 11,914,790 B2
(45) Date of Patent: Feb. 27, 2024

(54) METHOD FOR CONTROLLING EXTERNAL ELECTRONIC DEVICE, AND ELECTRONIC DEVICE THEREFOR

(71) Applicant: SAMSUNG ELECTRONICS CO., LTD., Suwon-si (KR)

(72) Inventors: Miji Park, Suwon-si (KR); Zion Kwon, Suwon-si (KR); Youbi Seo, Suwon-si (KR); Jiyeon Sung, Suwon-si (KR); Yoonho Lee, Suwon-si (KR); Eunkyung Lee, Suwon-si (KR); Dohee Chung, Suwon-si (KR); Younghak Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/896,404

(22) Filed: Aug. 26, 2022

(65) Prior Publication Data

US 2022/0413622 A1    Dec. 29, 2022

Related U.S. Application Data

(63) Continuation of application No. PCT/KR2021/002210, filed on Feb. 22, 2021.

(30) Foreign Application Priority Data

Feb. 26, 2020   (KR) .................. 10-2020-0023678

(51) Int. Cl.
*G06F 3/01* (2006.01)
(52) U.S. Cl.
CPC ................... *G06F 3/017* (2013.01)

(58) Field of Classification Search
CPC ..... G06F 3/017; G06F 3/14; G06F 3/16; G06F 3/165; A01K 29/005; G06Q 50/163; G06Q 10/10; G06V 20/52; G06V 40/20
See application file for complete search history.

(56) References Cited

U.S. PATENT DOCUMENTS

| 7,424,867 B2 | 9/2008 | Kates |
| 10,310,456 B2 | 6/2019 | Galdwell et al. |

(Continued)

FOREIGN PATENT DOCUMENTS

| JP | 2003-000085 A | 1/2003 |
| JP | 2007-141219 A | 6/2007 |

(Continued)

*Primary Examiner* — Grant Sitta
(74) *Attorney, Agent, or Firm* — Sughrue Mion, PLLC

(57) ABSTRACT

An electronic device may include a communication circuit; a display; a memory storing instructions; and at least one processor configured to execute the instructions to: obtain, from an external server via the communication circuit, first routine data including control operation information indicating an operation of controlling an external electronic device and control condition information indicating a condition enabling the control operation information to be executed, control the display to display the control condition information, and modify the control condition information based on a first user input regarding the displayed control condition information, control the display to display the control operation information, and modify the control operation information based on a second user input regarding the displayed control operation information, and control the communication circuit to transmit, to the external server, second routine data including the modified control condition information and the modified control operation information.

12 Claims, 15 Drawing Sheets

(56) References Cited

U.S. PATENT DOCUMENTS

| | | |
|---|---|---|
| 11,223,936 B2 | 1/2022 | Park et al. |
| 2016/0057395 A1* | 2/2016 | Yuki .................... A01K 29/005 348/222.1 |
| 2018/0367329 A1 | 12/2018 | Shin |
| 2019/0034051 A1* | 1/2019 | Jeon .................... H04L 12/2816 |

FOREIGN PATENT DOCUMENTS

| | | |
|---|---|---|
| JP | 2016-042870 A | 4/2016 |
| KR | 10-1256054 B1 | 4/2013 |
| KR | 10-2019-0061423 A | 6/2019 |
| WO | 2016/053625 A1 | 4/2016 |
| WO | 2017/078724 A1 | 5/2017 |

\* cited by examiner

METHOD FOR CONTROLLING EXTERNAL ELECTRONIC DEVICE, AND ELECTRONIC DEVICE THEREFOR

CROSS-REFERENCE TO RELATED APPLICATION(S)

This application is a bypass continuation of International Application No. PCT/KR2021/002210, filed on Feb. 22, 2021, which is based on and claims priority to Korean Patent Application No. 10-2020-0023678, filed on Feb. 26, 2020, in the Korean Intellectual Property Office, the disclosure of which is incorporated by reference herein in its entirety.

BACKGROUND

1. Field

The disclosure relates to a method of controlling an external electronic device, and an electronic device thereof.

2. Description of Related Art

With the development of multimedia techniques, electronic devices having various functions have recently been introduced. In general, the electronic devices have a convergence function which performs one or more functions in combination.

A mobile terminal, i.e., a smartphone, is an electronic device that is equipped with a large-screen touch-type display module, and may play multimedia content such as music, video, or the like in addition to a basic function of communication with a peer user, and may perform various functions in combination.

In order to identify information of an object which has difficulty in communication, such as a pet, a baby, a physically challenged person, or the like, and to take an appropriate measure at the right time, a monitoring system technology may monitor information of a motion, location, or the like thereof and notify a user immediately.

The electronic device is equipped with such a monitoring function to periodically monitor external electronic devices including home appliances (e.g., a TV, an air conditioner, a refrigerator, a computer, a printer, or the like which may operate without a user), office equipment, as well as industrial electronic equipment, or the like, and determine a situation to control these devices.

The related art electronic device which monitors an object such as a pet or the like and controls an external electronic device has a problem and/or inconvenience in that a motion or gesture of the object shall be persistently monitored since a user has to recognize the motion or gesture of the object to identify a situation and directly control the external electronic device. In addition, even if the electronic device is able to automatically recognize the motion or gesture and control the external electronic device without a user's decision, there was no way to compensate for imperfection of a pre-set control algorithm due to an absence of a function capable of updating the pre-set control algorithm of the external electronic device.

SUMMARY

According to an aspect of the disclosure, an electronic device includes: a communication circuit; a display; a memory storing instructions; and at least one processor configured to execute the instructions to: obtain, from an external server via the communication circuit, first routine data including control operation information indicating an operation of controlling an external electronic device and control condition information indicating a condition enabling the control operation information to be executed, control the display to display the control condition information, and modify the control condition information based on a first user input regarding the displayed control condition information, control the display to display the control operation information, and modify the control operation information based on a second user input regarding the displayed control operation information, and control the communication circuit to transmit, to the external server, second routine data including the modified control condition information and the modified control operation information.

The control condition information may include at least one of object information, per-object gesture information, and information obtained from an external recognition device.

The information obtained through the external recognition device may include motion information of an object, voice information, location information, location-based motion information, and location-based voice information.

The first user input may include at least one of an input for adding or deleting an object and an input for modifying the per-object gesture information.

The first user input may include an input for configuring the per-object gesture information, based on an image.

The control operation information may include information of the external electronic device and a control operation for controlling the external electronic device.

The second user input may include at least one of an input for adding or deleting the external electronic device and an input for modifying the control operation.

The at least one processor may be further configured to execute the instructions to store, in the memory, second routine data including the modified control condition information and the modified control operation information.

According to an aspect of the disclosure, a method of controlling an external electronic device by an electronic device, includes: receiving, from an external server, first routine data including control operation information indicating an operation of controlling the external electronic device and control condition information indicating a condition enabling the control operation information to be executed; displaying on a display of the electronic device the control condition information, and modifying the control condition information based on a first user input regarding the displayed control condition information; displaying on the display the control operation information, and modifying the control operation information based on a second user input regarding the displayed control operation information; and transmitting to the external server, second routine data including the modified control condition information and the modified control operation information.

The control condition information may include at least one of object information, per-object gesture information, and information obtained from an external recognition device, and the information obtained through the external recognition device may include motion information of an object, voice information, location information, location-based motion information, and location-based voice information.

The first user input may include at least one of an input for adding or deleting the object and an input for modifying the per-object gesture information.

The first user input may include an input for configuring the per-object gesture information, based on an image.

The control operation information may include information of the external electronic device and a control operation for controlling the external electronic device.

The second user input may include at least one of an input for adding or deleting the external electronic device and an input for modifying the control operation.

According to an aspect of the disclosure, a server for storing and analyzing data, the server configured to: collect, from an external recognition device, first data obtained by the external recognition device; analyze the collected first data to generate and store first routine data including control operation information indicating an operation of controlling an external electronic device and control condition information indicating a condition enabling the control operation information to be executed; transmit the stored first routine data to an electronic device; receive second routine data from the electronic device; and update the first routine data in response to the received second routine data.

According to one or more embodiments of the disclosure, an electronic device receives, from an external server, routine data including control operation information indicating an operation of controlling an external electronic device and control condition information indicating a condition enabling the control operation information to be executed. Therefore, even if a user does not keep an eye on an object, the electronic device may take an appropriate measure by automatically controlling the external device.

According to one or more embodiments of the disclosure, a user may be allowed to directly modify or configure control operation information and control condition information, thereby compensating for imperfection of automatic gesture recognition and increasing accuracy of gesture recognition.

According to one or more embodiments of the disclosure, a UX screen may be provided to a user to intuitively display a gesture recognized for each object and a corresponding control process of an external electronic device.

According to one or more embodiments of the disclosure, even if a user does not keep an eye on an object, an electronic device can not only automatically recognizes a motion or gesture of the object and control an external electronic device to take an appropriate measure but also allow the user to directly determine details of the gesture. Therefore, it is possible to provide an electronic device capable of compensating for imperfection of automatic gesture recognition.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
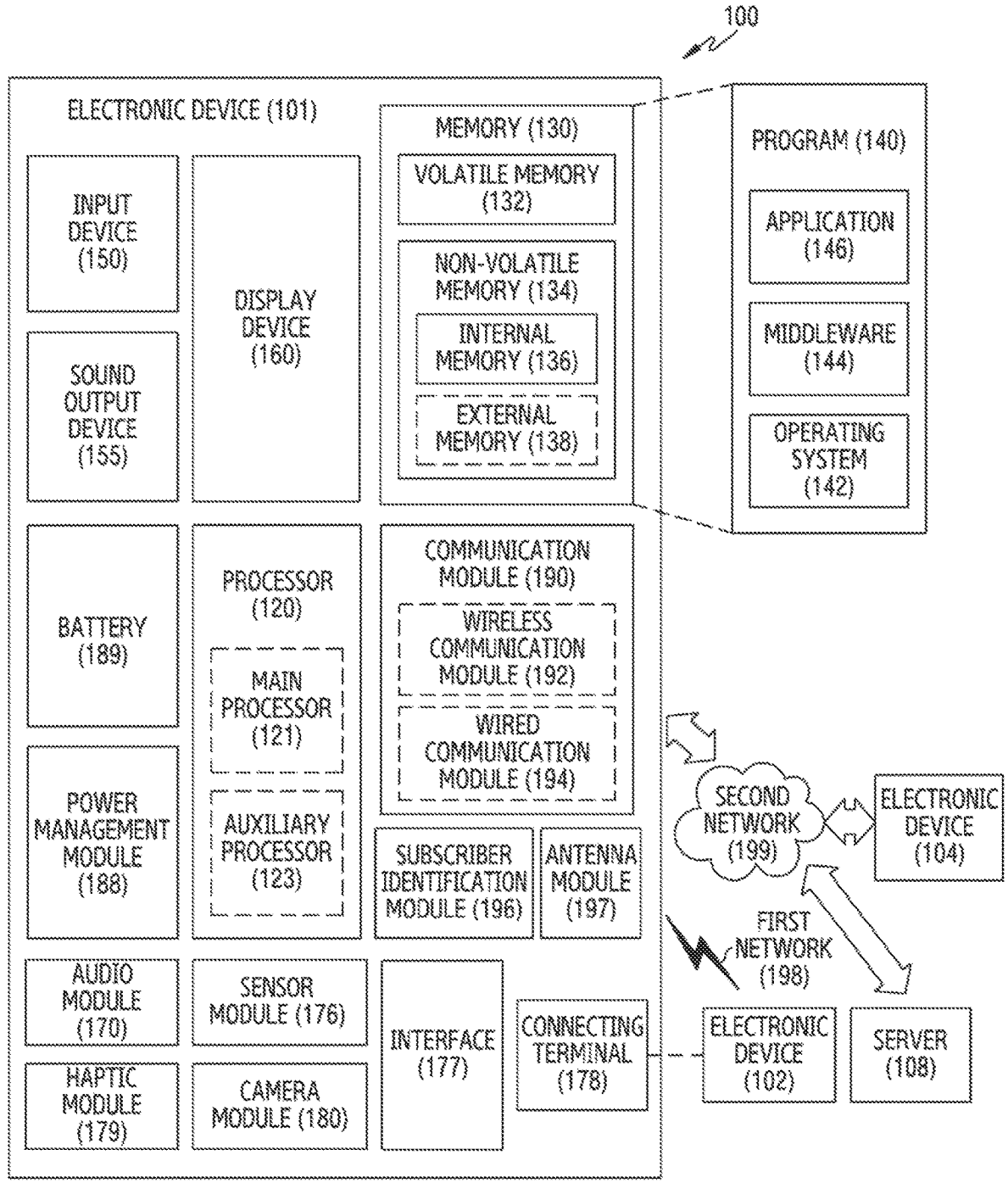
FIG. 1 is a block diagram of an electronic device in a network environment according to various embodiments.

Hereinafter, various embodiments of the disclosure will be described in detail with reference to the accompanying drawings. Components shown in the drawings may be exaggerated or reduced in size for convenience of explanation, and the disclosure is not necessarily limited thereto. With regard to the description of the drawings, similar reference numerals may be used to refer to similar or related elements.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
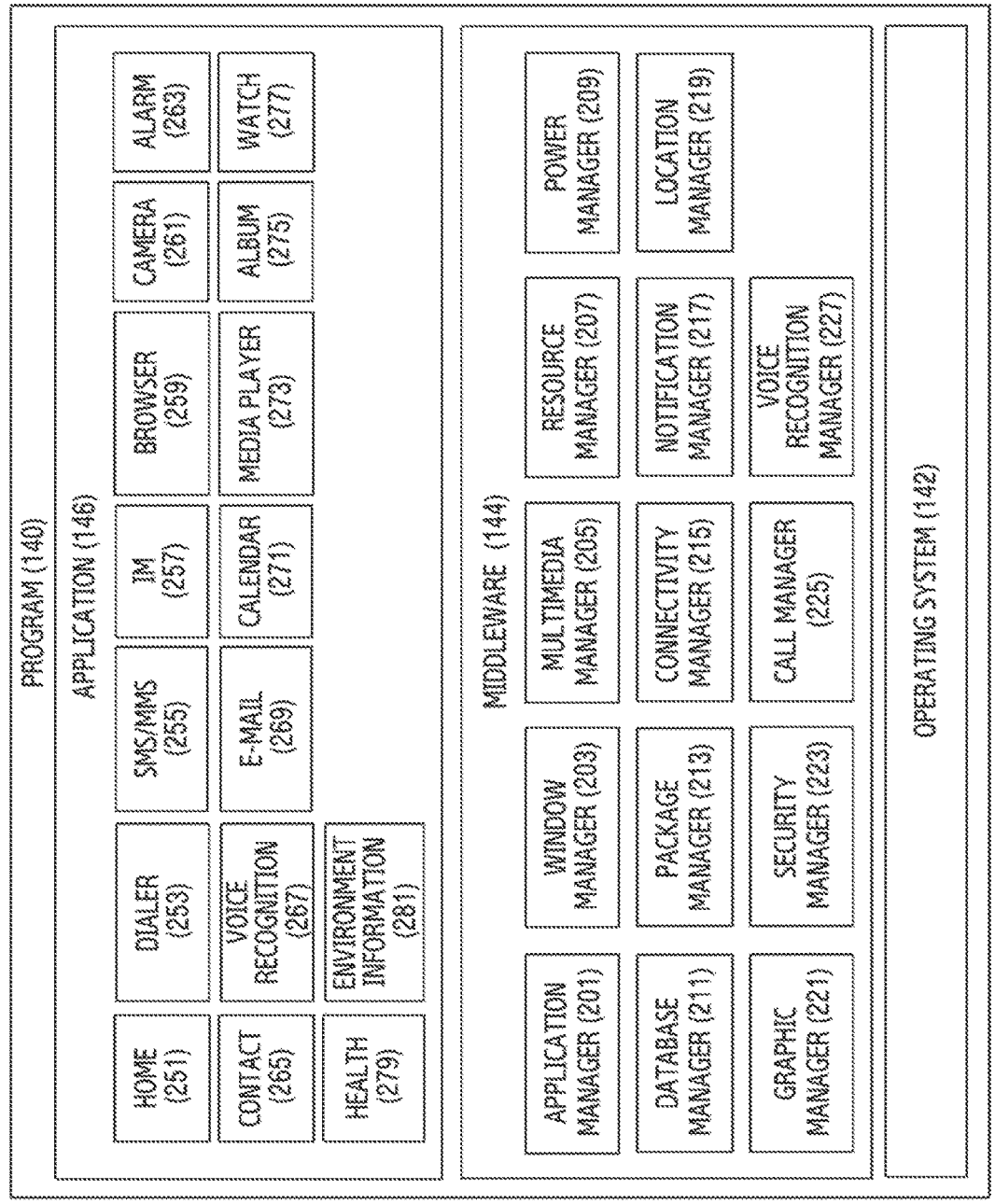
FIG. 2 is a block diagram illustrating a program according to various embodiments.

FIG. 2 is a block diagram 200 illustrating the program 140 according to various embodiments. According to an embodiment, the program 140 may include an operating system (OS) 142 for controlling a resource related to an electronic device 101, a middleware 144 or an application 146 running on the operating system 142. The operating system 142 may be, for example, Android™, iOS™, Windows™, Symbian™, Tizen™, or Bada™. At least a part of the program 140 may be preloaded on an electronic device 101 or may be downloaded from an external electronic device (e.g., the electronic device 102 or 104, or the server 108).

The operating system 142 may perform control (e.g., allocation, or retrieval) of one or more system resources (e.g., a process, a memory or a power). Additionally or alternatively, the operating system 142 may include one or more driver programs for driving other hardware devices, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197 of the electronic device 101

The middleware 144 may provide various functions to the application 146 so that the application 146 uses a function or information provided from one or more resources. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may mange, for example, a life cycle of the applications 146. The window manager 203 may manage, for example, a GUI resource used in a screen. The multimedia manager 205, for example, may recognize a format required for playing various media files and may encode or decode a media file using a codec matched to the format. The resource manager 207 may manage, for example, a source code of the application 146 or a storage space of the memory 130. The power manager 209, for example, may manage a capacity of the battery 189, a temperature or power and may determine or provide related information required for operating the electronic device 101 using among corresponding information. According to an embodiment, the power manager 209 may operate together with a basic input/output system (BIOS) of the electronic device 101.

The database manager 211, for example, may generate, search, or modify a database to be used in the applications 146. The package manager 213, for example, may manage installation or update of an application distributed in a package file format. The connectivity manager 215, for example, may manage wireless connection or direct connection between the electronic device 101 and an external electronic device. The notification manager 217, for example, may provide a function to notify an occurrence of a designated event (e.g., an incoming call, a message, or an alarm) to a user. The location manager 219, for example, may manage location information of the electronic device 101. The graphic manager 221, for example, may manage a graphic effect to be provided to a user or a user interface related thereto.

The security manager 223, for example, may provide system security or user authentication. The telephony manager 225, for example, may manage a voice call function or a video call function provided by the electronic device 101. The voice recognition manager 227, for example, may transmit a voice data of the user to the server 108, and receive a command corresponding a function performed in the electronic device 101 based on the voice data, or text data transformed based on the voice data. According to an embodiment, the middleware 244 may delete a part of existing elements or may add new elements dynamically. According to an embodiment, at least a part of the middleware 144 may include a part of the operating system 142, or be implemented as separate software different from the operating system 142.

The application 146, for example, may include applications such as a home 251, a dialer 253, an SMS/MMS 255, an instant message (IM) 257, a browser 259, a camera 261, an alarm 263, a contact 265, a voice recognition 267, an e-mail 269, a calendar 271, a media player 273, an album 275, a watch 277, a health 279 (e.g., measure an exercise amount or blood sugar), or environmental information 281 (e.g., provide air pressure, humidity, or temperature information). According to an embodiment, the application 146 may include an information exchange application for supporting information exchange between the electronic device 101 and an external electronic device. The information exchange application may include, for example, a notification relay application for relaying specific information to the external electronic device or a device management application for managing the external electronic device. For example, the notification relay application may relay notification information corresponding to a designated event (e.g., receiving a mail) occurred in another application (e.g., an e-mail application 269) of the electronic device 101 to an external electronic device. Additionally or alternatively, the notification relay application may receive notification information from the external electronic device and may provide the received notification information to the user of the electronic device 101.

The device management application, for example, may control power (e.g., turn-on or turn-off) or a function (e.g., brightness, resolution, or focus of the display device 160 or the camera module 180) of an external electronic device communicating with the electronic device 101 or a partial element thereof. The device management application, additionally or alternatively, may support install, delete, or update of an application running in the external electronic device.

Figure 3:
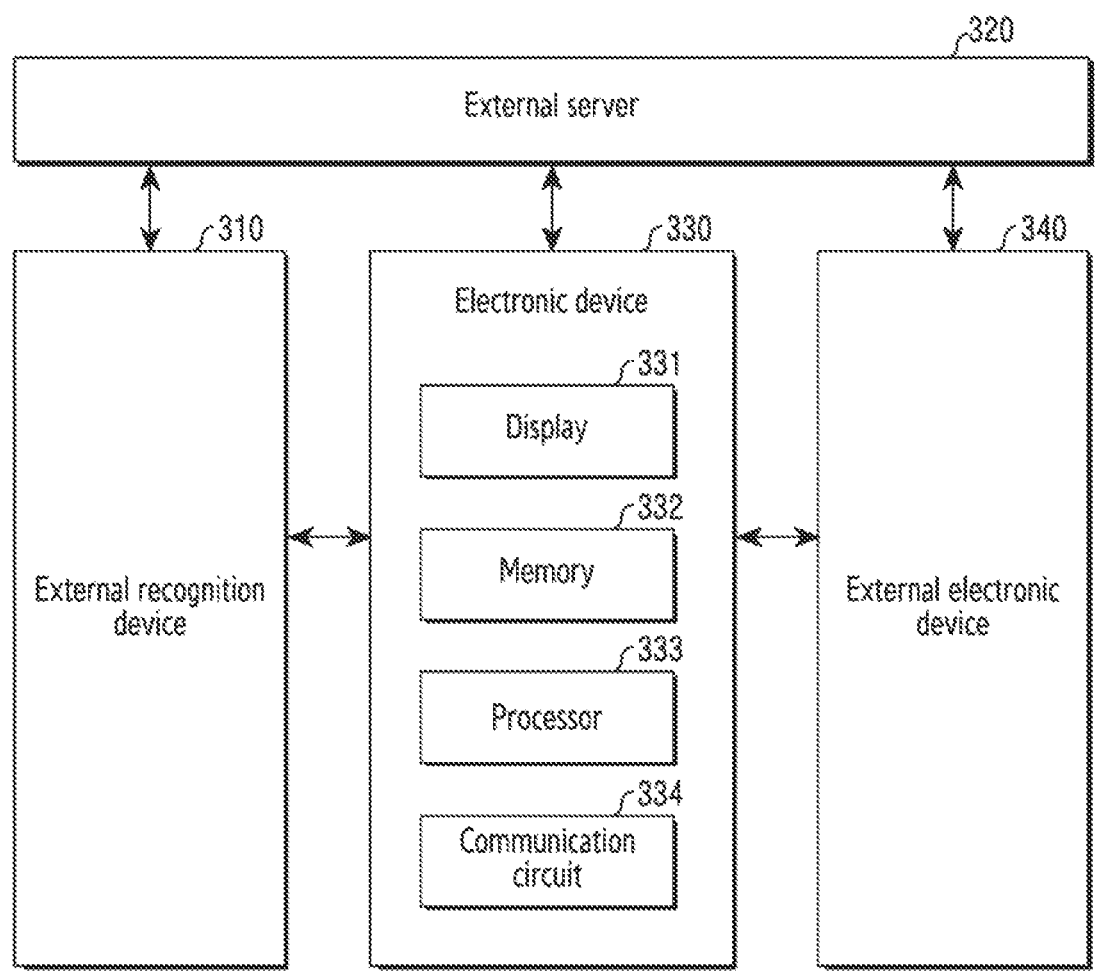
FIG. 3 is a block diagram illustrating a relationship of an electronic device, an external server, and external devices according to an embodiment.

FIG. 3 is a block diagram illustrating a relationship of an electronic device, an external server, and external devices according to an embodiment. Referring to FIG. 3, an electronic device 330 (e.g., the electronic device 101 of FIG. 1) and external devices (an external recognition device 310 or external electronic device 340 of FIG. 3) may transmit or receive information by using wired or wireless communication with an external server (e.g., the server 108 of FIG. 1), and may control mutual operations. According to an embodiment, the external recognition device 310 may obtain information including motion information of objects, and may transmit to an external server 320 the information obtained from the external recognition device 310. The external server 320 may collect, process, and store the information received from the external recognition device 310, and may transmit to the electronic device 330 the information processed in the external server 320. According to an embodiment, the electronic device 330 may modify the information received from the external server 320, based on a user configuration, and may transmit again to the external server 320 the information modified in the electronic device 330. According to an embodiment, the external server 320 may update pre-stored information by collecting the information received from the electronic device 330, and may control an operation of the external electronic device 340 in response to the received information.

Information transmission/reception performed between the external recognition device 310, the external server 320, the electronic device 330, and the external electronic device 340 is not limited to the aforementioned method, and information may be transmitted or received without having to use the external server 320. For example, the external recognition device 310 may directly transmit obtained information to the electronic device 330. The electronic device 330 may directly process the received information and transmit the received information to the external server 320, and may directly control an operation of the external electronic device 340 in response to the information received from the external recognition device 310.

According to an embodiment, the external recognition device 310 may be a device capable of obtaining motion information, voice information, location information, or the like of an object, and may include, for example, a camera, an electromyograph, a position sensor, or the like. The object to be recognized by the external recognition device 310 may be an object which has difficulty in communication, and may include, for example, a pet, a baby, a physically challenged person, or the like. According to an embodiment, the external recognition device 310 may be attached to the object and may be installed at a predetermined location in an indoor space or may be installed in furniture or electronic products located in the indoor space. According to an embodiment, the external recognition device 310 may not only obtain information for each object, such as motion information, voice information, location information, or the like, but also obtain associated information such as location-based motion information, location-based voice information, or the like. For example, a camera of the external recognition device 310 may recognize that a baby moves from a state of being motionless, and a position sensor of the external recognition device 310 may recognize that the baby is on a rocking bed in a baby's room and, in association with information thereof, may obtain information indicating that the baby moves from a state of being motionless on the rocking bed. The external server 320 may analyze the associated information to identify it as a gesture indicating that the baby has woken up, thereby increasing accuracy of a gesture identification process.

According to an embodiment, the external server 320 may transmit or receive information by using a wired or wireless communication circuit 334 with the external recognition device 310, the electronic device 330, and the external electronic device 340. According to an embodiment, the external server 320 may collect, analyze, and store the received information and update the stored information, and may autonomously learn an analysis process by building a Database (DB) of the received information or using a machine learning model. According to an embodiment, the external server 320 may analyze the received information to process it into first routine data including control operation information indicating an operation of controlling at least one external electronic device 340 and control condition information indicating a condition for enabling the control operation information to be executed. The control condition information, the control operation information, and the first routine data will be described below in detail.

According to an embodiment, the electronic device 330 may include a display 331, a memory 332, a processor 333, and a communication circuit 334. A structure of the electronic device 330 is not limited thereto, and according to an embodiment, the electronic device 330 may omit at least one of the aforementioned components or may further include at least one of other components.

According to an embodiment, the display 331 (e.g., the display device 160 of FIG. 1) may display a variety of content (e.g., a text, an image, a video, an icon, a symbol, etc.). The display 331 may include a touch screen, and may receive, for example, a touch, gesture, proximity, or hovering input using an electronic pen or a user's body part. According to an embodiment, the display 331 may output control condition information or control operation information received from the external server 320 on a screen, and may display a user's input on the screen in response to a user input for the control condition information or the control operation information.

According to an embodiment, the display 331 may provide a rectangular screen. However, a shape of the screen provided by the display 331 is not limited to a rectangle, and may include a quadrangle with rounded corners, a circle, a quadrangle having a notch area, a quadrangle having a circular hole in some areas, or the like, according to a type or design of the electronic device. In the disclosure, although a situation in which the display 331 has a quadrangle shape and a user input is input based on a horizontal direction of the display is assumed for convenience of explanation, various modifications are possible. For example, embodiments of the disclosure may also be applied to a situation in which the user input is input based on a vertical direction of the display.

According to an embodiment, the memory 332 (e.g., the memory 130 of FIG. 1) may store a variety of data used by at least one component of the electronic device 330. According to an embodiment, the memory 332 may store the variety of data by receiving and modifying first routine data to configure second routine data, and may store at least one instruction related to control condition information and control operation information for controlling the external electronic device 340, based on the control condition information.

According to an embodiment, the processor 333 (e.g., the processor 120 of FIG. 1) may control at least one of other components of the electronic device 330 and may perform various data processing or operations. According to an embodiment, the processor 333 may be electrically coupled to the display 331 and the memory 332 and may execute instructions stored in the memory 332. According to an embodiment, the processor 333 may execute at least one instruction configured to receive and modify the first routine data to configure the second routine data. Since the instruction is executed by the processor 333, the electronic device 330 may perform a function corresponding to the instruction.

According to an embodiment, the processor 333 may execute instructions to receive, from an external server, first routine data including control operation information indicating an operation of controlling at least one external electronic device and control condition information indicating a condition enabling the control operation information to be executed, control a display to display the control condition information, and modify the control condition information in response to a first user input regarding the displayed control condition information, control the display to display the control operation information, and modify the control operation information in response to a second user input regarding the displayed control operation information, and transmit, to the external server, second routine data including the modified control condition information and the modified control operation information.

According to an embodiment, the communication circuit 334 supporting communication between the external recognition device 310, the external server 320, or the external electronic device 340. According to an embodiment, the communication circuit 334 may receive or transmit data from the external recognition device 310, the external server 320, or the external electronic device 340.

Figure 4:
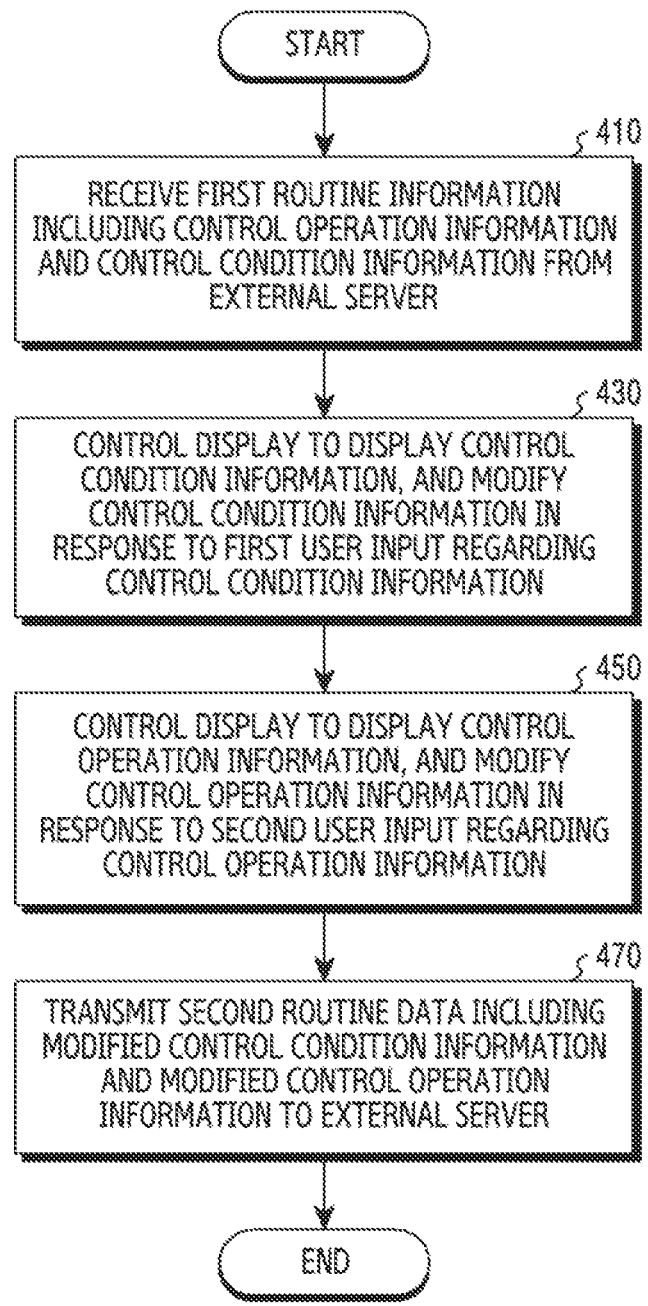
FIG. 4 is a flowchart illustrating a method of controlling an external electronic device of an electronic device according to an embodiment.

FIG. 4 is a flowchart illustrating a method of controlling the external electronic device 340 of the electronic device 330 according to an embodiment. An operation of FIG. 4 may be performed by the electronic device 330 of FIG. 3. Referring to FIG. 4, the processor 333 of the electronic device 330 according to an embodiment may perform an operation 410 of receiving, from the external server 320, first routine data including control operation information indicating an operation of controlling at least one external electronic device 340 and control condition information indicating a condition enabling the control operation information to be executed, an operation 430 of controlling the display 331 to display the control condition information, and modifying the control condition information in response to a first user input regarding the control condition information, an operation 450 of controlling the display 331 to display the control operation information, and modifying the control operation information in response to a second user input regarding the control operation information, and an operation 470 of transmitting, to the external server 320, second routine data including the modified control condition information and the modified control operation information.

In the operation 410, the processor 333 according to an embodiment may receive, from the external server 320, first routine data including control operation information indicating an operation of controlling at least one external electronic device 340 and control condition information indicating a condition enabling the control operation information to be executed. Hereinafter, the control condition information, the control operation information, and the first routine data are described in detail with reference to FIG. 5.

Figure 5:
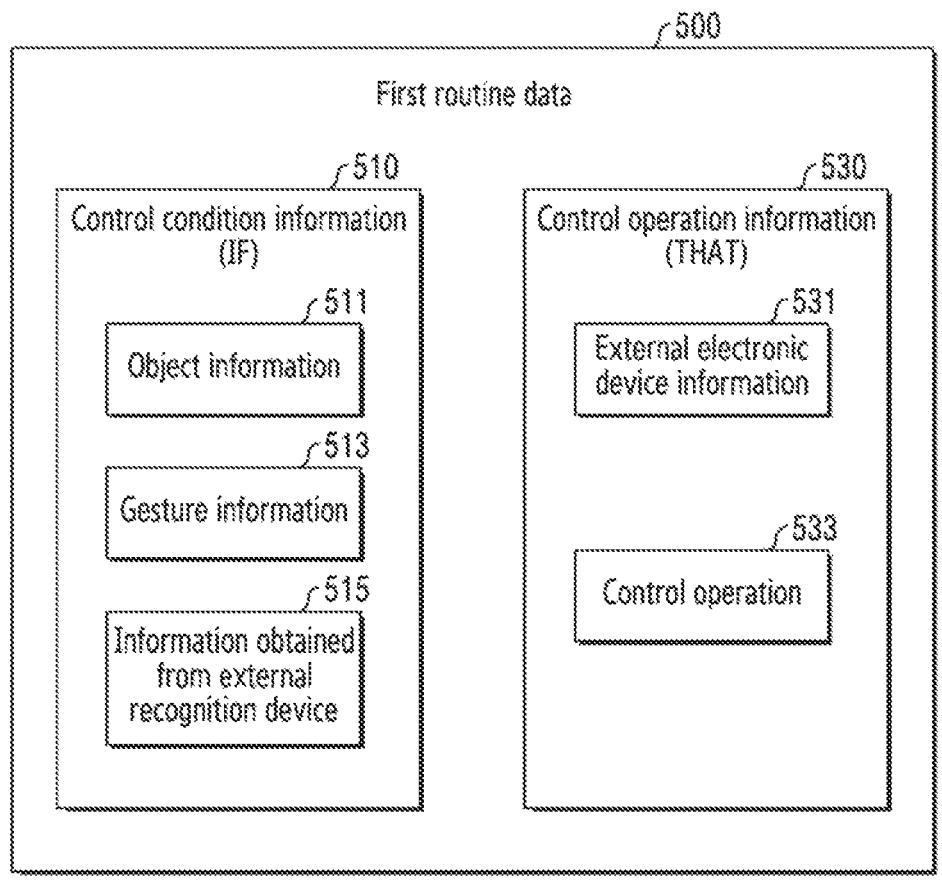
FIG. 5 is a block diagram illustrating first routine data according to an embodiment.

FIG. 5 is a block diagram illustrating first routine data according to an embodiment. Referring to FIG. 5, first routine data 500 may include control condition information (IF) 510 and control operation information (THAT) 530. The control condition information (IF) 510 may include object information 511, gesture information 513, and information 515 obtained from an external recognition device. The control operation information (THAT) 530 may include external electronic device information 531 and a control operation 533. The object information 511 constituting the control condition information (IF) 510 may include information for identifying at least one object from an object group, and the external electronic device information 531 constituting the control operation information (THAT) 530 may include information on an external electronic device which is a target of a control operation.

Routine data in the aforementioned first routine data is data consisting of a pair of the control condition information 510, which is generated by analyzing data obtained from at least one external recognition device 310, and the control operation information 530 corresponding thereto, and when the data obtained from the external recognition device 310 satisfies the information 515 obtained from the external recognition device and included in the control condition information 510 of the routine data, may be data configured to control the at least one external electronic device 340, based on the control operation information 530 of the routine data.

An object indicated by the object information 511 according to an embodiment may mean a target for which the external recognition device 310 obtains information (e.g., motion information, location information). For example, the object may be a target having difficulty in communication, and the object may include a pet, a baby, a physically challenged person, or an elderly person. The gesture information 513 according to an embodiment may be information processed by analyzing the information 515 obtained from the external recognition device, and may include behavior-related information for each object. The information 515 obtained from the external recognition device according to an embodiment is information obtained from the external recognition device 310, i.e., a camera, an electromyograph, a position sensor, or the like, and may include at least one of per-object motion information, voice information, location information, location-based motion information, and location-based voice information.

According to an embodiment, the information 515 obtained from the external recognition device is information obtained by analyzing data (e.g., object location information, object motion information) input from the external recognition device 310, and the gesture information 513 may be a behavior or state of an object corresponding to the information 515 obtained from the external recognition device. For example, the information 515 obtained from the recognition device is motion information indicating that a puppy sits down on a defecation pad, and the gesture information 513 corresponding thereto may be a gesture indicating that the puppy is defecating. For another example, the information 515 obtained from the external recognition device is information indicating that a grandfather is in a motionless state without a movement for a specific period of time in a bathroom, and the gesture information 513 corresponding thereto may be a gesture indicating that the grandfather has collapsed.

According to an embodiment, in the external electronic device information 531, the external electronic device may be an electronic product or a home appliance as a target of a control operation, and may include, for example, a pet toy, a pet feeder, an air purifier, a rocking bed, a smart home speaker, a smart home camera, or a smart phone. The control operation 533 according to an embodiment may be an operation for controlling the individual external electronic devices 340 constituting the external electronic device information 531, and may include, for example, an operation of turning on the power of the external electronic device 340 or an operation of executing a pre-set function of the external electronic device 340.

The control operation information (THAT) 530 according to an embodiment may include the external electronic device information 531 and the control operation 533 for controlling the at least one external electronic device 340 indicated by the external electronic device information 531. For example, the control operation 533 constituting the control operation information 530 may include an operation of turning on the power of the pet toy, an operation of turning on the power of the air purifier, or an operation of executing an alarm function of the smart phone.

The first routine data 500 may include a set of the control condition information (IF) 510 and the control operation information (THAT) 530 corresponding thereto. Hereinafter, a configuration of the first routine data 500 is described in detail with reference to FIG. 6.

Figure 6:
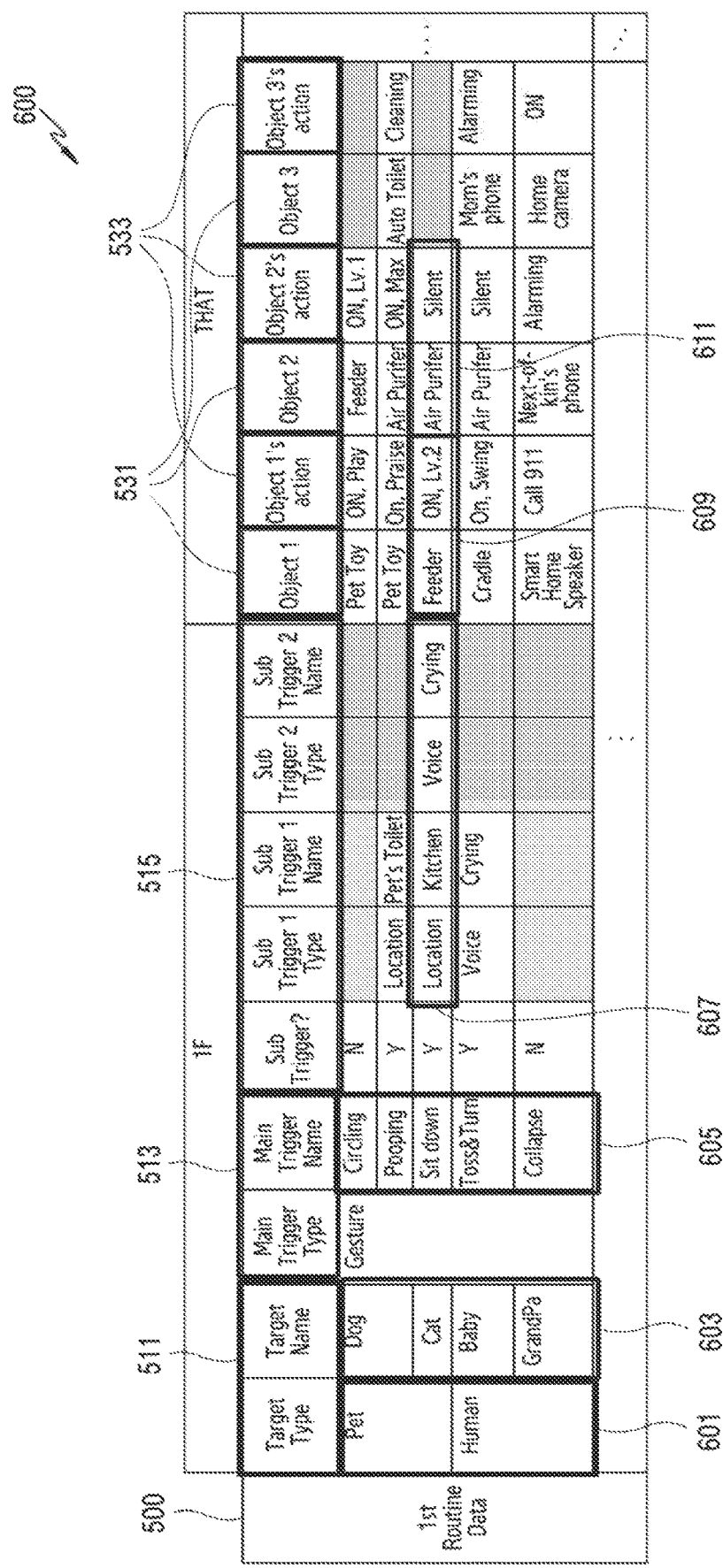
FIG. 6 is an example diagram illustrating first routine data according to an embodiment.

FIG. 6 is an example diagram illustrating the first routine data 500 according to an embodiment. Referring to FIG. 6, the first routine data 500 according to an embodiment may consist of a set of the control condition information 510, which includes the object information 511 consisting of a target type and a target name, the gesture information 513 consisting of a main trigger type and a main trigger name, the information 515 obtained from the external recognition device and consisting of a sub trigger type and a sub trigger name, and the control operation information (THAT) 530 which includes the external electronic device information 531 consisting of an object and the control operation 533 consisting of an object's action. Referring to FIG. 6, an object of the object information 511 constituting the control condition information (IF) 510 may be a puppy, a cat, a baby, and a grandfather (603), and the gesture information 513 may be an action in which the puppy is circling, an action in which the puppy is defecating, an action in which the cat sits down, an action in which the baby tosses and turns, or an action in which the grandfather has collapsed (605). Referring to FIG. 6, for example, the set of the control condition information (IF) 510 and the control operation information (THAT) 530 corresponding thereto may be control condition information 607 indicating a cat crying while sitting in a kitchen, and control operation information corresponding thereto, i.e., an operation 609 in which a feeder of a pet is powered on to feed the animal and an operation 611 in which an air purifier becomes silent.

Returning to FIG. 4, in the operation 430, the processor 333 according to an embodiment may control the display 331 to display the control condition information 510 and modify the control condition information 510 in response to a first user input for the displayed control condition information 510. Hereinafter, a process of modifying the control condition information 510 is described with reference to FIG. 7.

Figure 7:
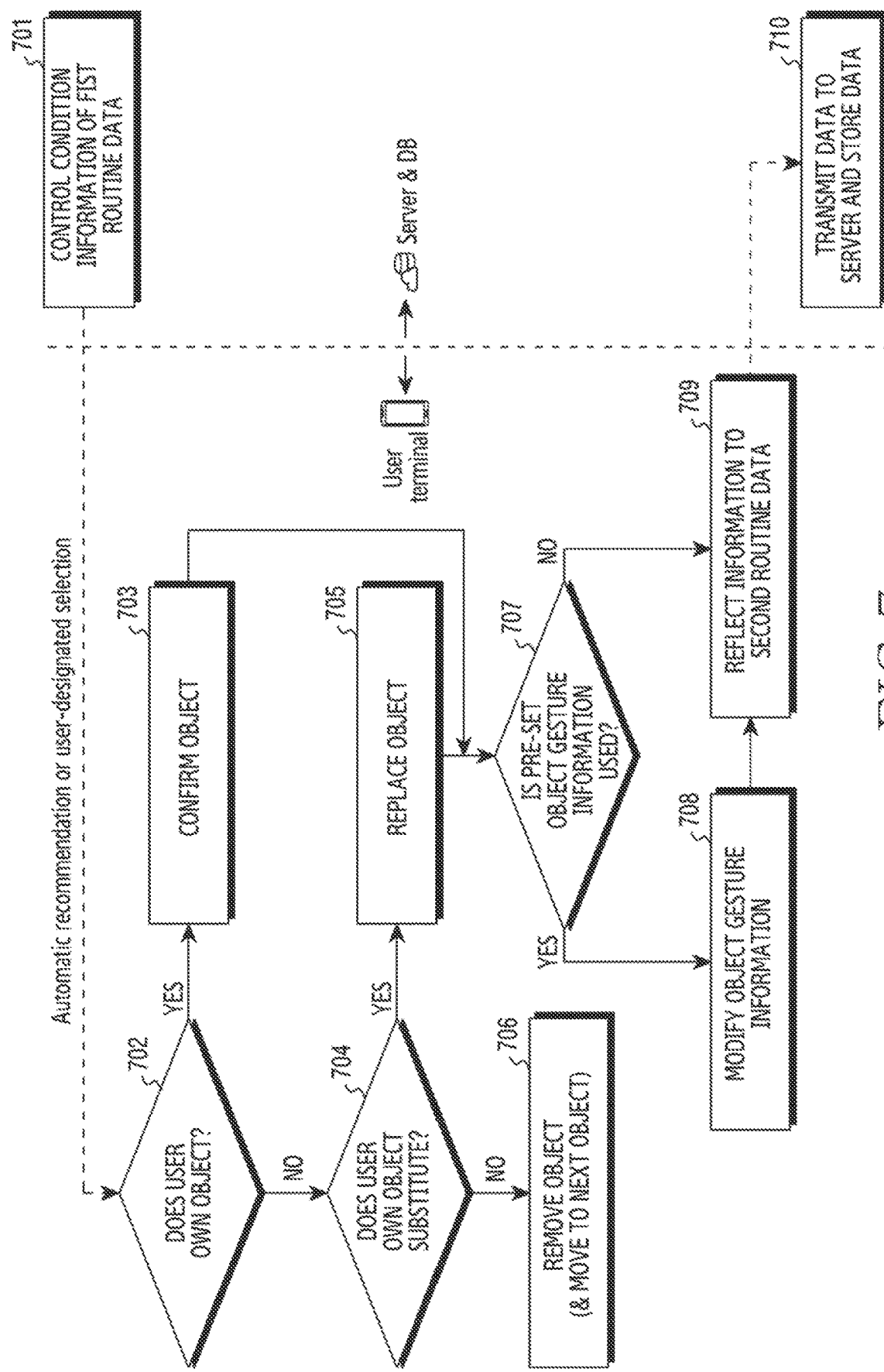
FIG. 7 is an example diagram illustrating a method of modifying control condition information of first routine data according to an embodiment.

FIG. 7 is an example diagram illustrating a method of modifying the control condition information 510 of the first routine data 500 according to an embodiment. According to an embodiment, the external server 320 may generate first routine data (701). For example, the external server 320 is information obtained from the external recognition device 310, and may analyze an image for a target to be recognized and recognize a behavior of the target to be recognized. The external server 320 may predict a behavioral pattern of the target to be recognized (e.g., a pattern in which an animal 'dog' defecates after showing a behavior of kicking with a hind leg), by using a machine learning algorithm to learn the behavior of the target to be recognized. The external server 320 may compare the predicted behavioral pattern and routine data pre-stored in the external server 320. When there is no pre-set routine data matched to the predicted behavioral pattern, the external server 320 may determine a control operation (e.g., an output change) of an object (e.g., an air purifier) which is a control target corresponding to the predicted behavioral pattern. The external server 320 may generate first routine data to be recommended to a user, based on the predicted behavioral pattern, the object to be the control target, and the control operation. However, the aforementioned process in which the external server 320 generates the first routine data is for describing an embodiment, and may vary depending on an embodiment. For example, the first routine data may include a behavioral pattern which is used as control condition information but may not include control operation information, and this may be allowed to be designated by a user input.

Referring to FIG. 7, the processor 333 according to an embodiment may receive the control condition information 510 from the external server 320 when the external server 320 intends to recommend the control condition information 510 of first routine data. For example, when the first routine data is generated, the external server 320 may send a push message to an electronic device (e.g., the electronic device 101 of FIG. 1) including the processor 333. When the electronic device receives the control condition information 510 of the first routine data from the external server 320 in response to a user input for the push message, a display (e.g., the display 331 of FIG. 3) of the electronic device may be controlled to display the control condition information 510. Alternatively, in response to a user input which is input to the electronic device or a configuration (e.g., a recommendation cycle) designated in the electronic device, the processor 333 may request the external server 320 to recommend the control condition information 510 to receive the control condition information 510 of the first routine data (701). Depending on whether a user owns an object (702), the processor 333 according to an embodiment may confirm an object included in the control condition information 510 (703). Alternatively, depending on whether the user owns an object substitute (704), the processor 333 may replace the object (705), or when the object or the object substitute is not owned, may remove the object (706). When the object is confirmed or replaced, the processor 333 according to an embodiment may determine whether to use pre-set gesture information (707). The processor 333 may reflect gesture information of the object to second routine data according to the determination (709). The processor 333 may transmit the modified second routine data to an external server and may store the data (710). According to an embodiment, the aforementioned operations 701 to 710 may be input to the electronic device as a first user input, and the display 331 may output a process in which the control condition information 510 is modified in response to the first user input.

Returning to FIG. 4, in the operation 450, the processor 333 according to an embodiment may control the display 331 to display the control operation information 530 and modify the control operation information 530 in response to a second user input for the control operation information 530. Hereinafter, a process of modifying the control operation information 530 is described with reference to FIG. 8.

Figure 8:
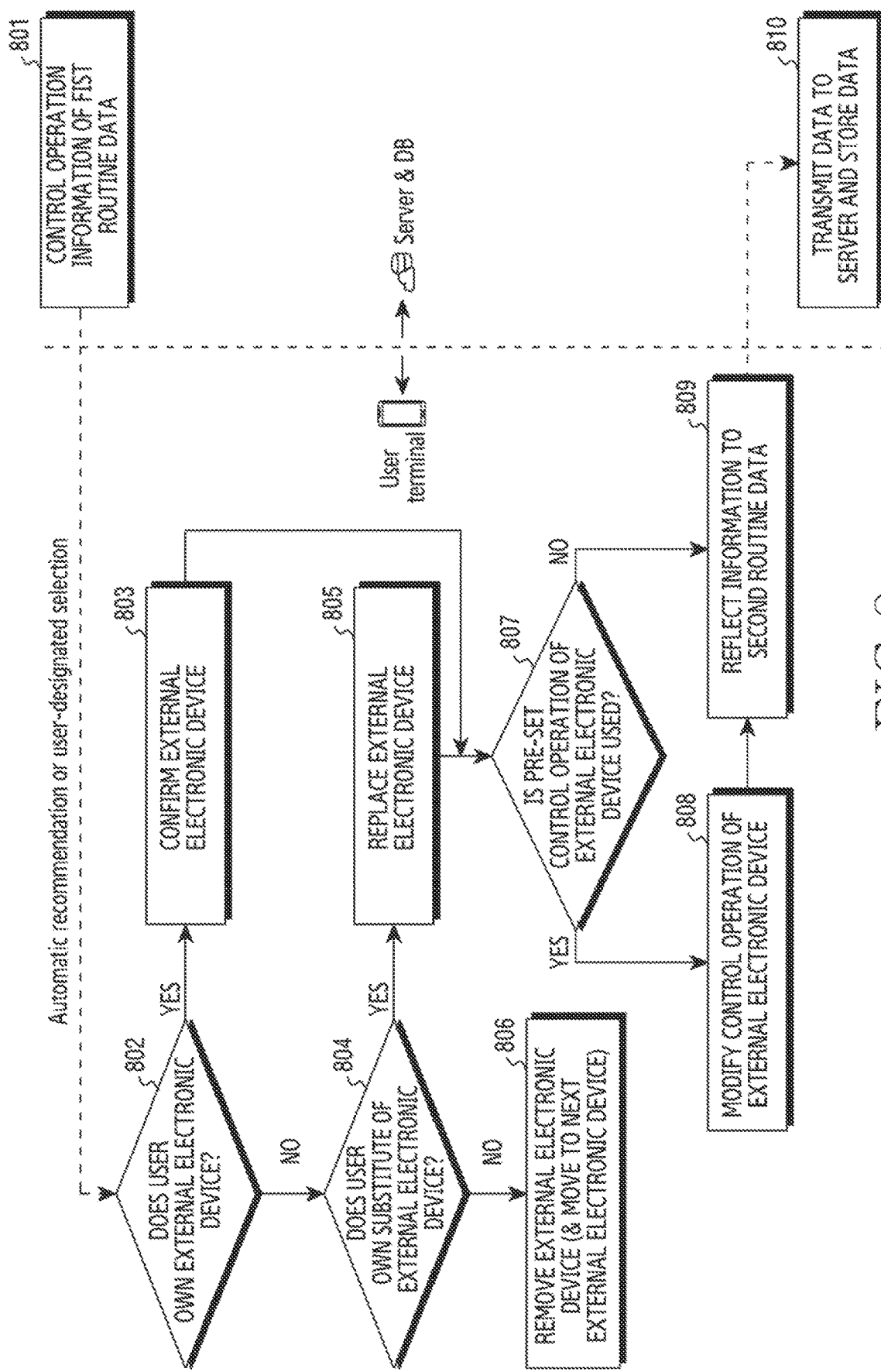
FIG. 8 is an example diagram illustrating a method of modifying control operation information of first routine data according to an embodiment.

FIG. 8 is an example diagram illustrating a method of modifying the control operation information 530 of the first routine data 500 according to an embodiment. Referring to FIG. 8, the processor 333 according to an embodiment may receive the control operation information 530 of the first routine data from the external server 320 through a recommendation or may receive it through user's designation (801). Depending on whether a user owns the external electronic device, the processor 333 according to an embodiment may confirm an external electronic device (803). Alternatively, depending on whether the user owns an electronic device substitute (804), the processor 333 may replace the external electronic device (805), and when the external electronic device or the external electronic device substitute is not owned, may remove the external electronic device (806). When the external electronic device is confirmed or replaced, the processor 333 according to an embodiment may determine whether to use a pre-set control operation of the external electronic device (807). According to the determination, the processor 333 may modify the control operation of the external electronic device (808) and reflect it to second routine data (809), and may transmit the modified second routine data to the external server and store the data (810). According to an embodiment, the aforementioned operations 801 to 810 may be input to the electronic device as a second user input, and the display 331 may output a process in which the control operation information 530 is modified in response to the second user input.

Examples related to FIG. 7 and FIG. 8 are described with reference to FIG. 9 to FIG. 12.

Figure 9:
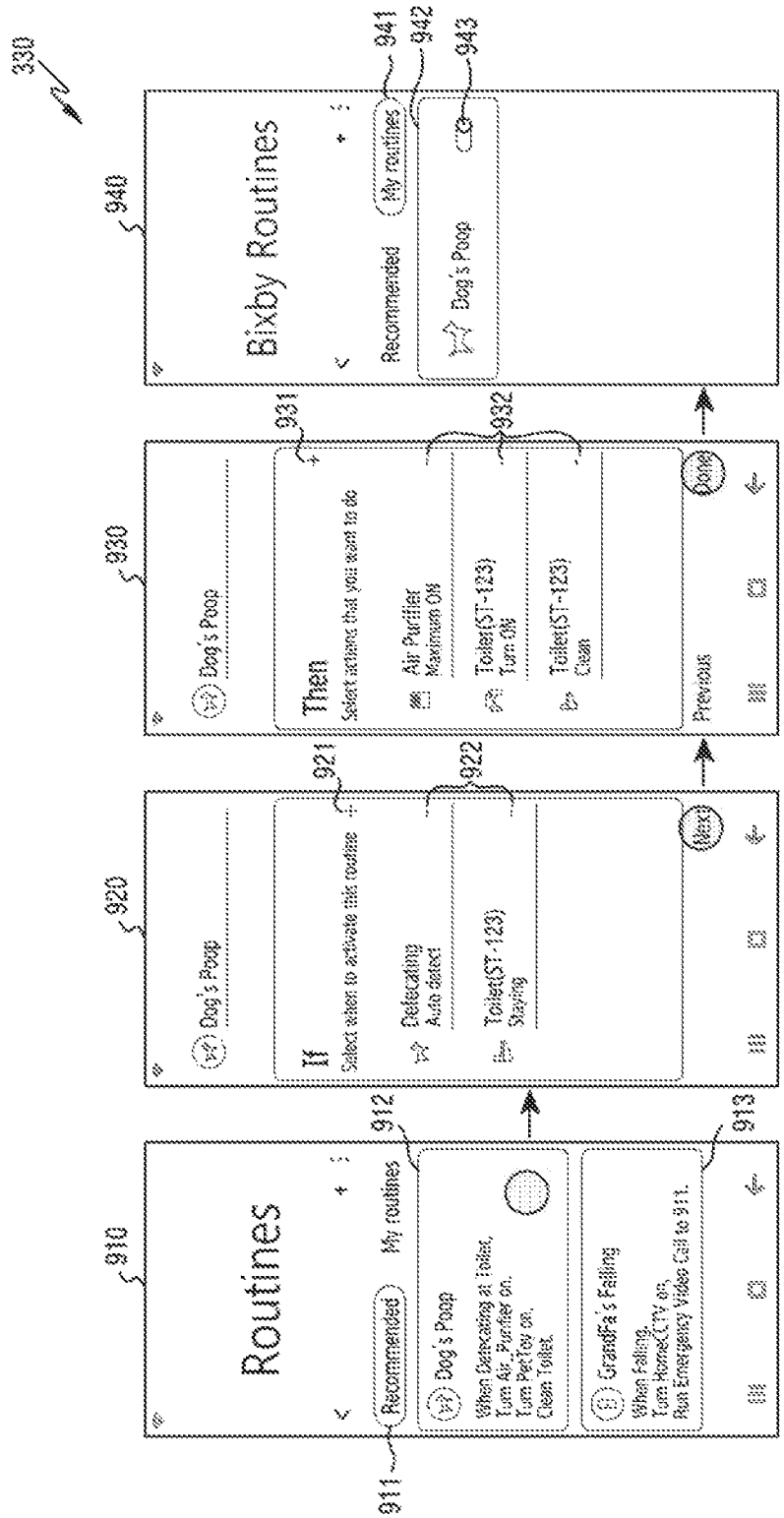
FIG. 9 is an example diagram illustrating a method of modifying first routine data in an electronic device according to an embodiment.

FIG. 9 is an example diagram illustrating a method of modifying the first routine data 500 in the electronic device 330 according to an embodiment. In FIG. 9, an example in which the first routine data 500 received from the external server 320 is displayed on the display 331 is shown in a screen 910. Referring to the screen 910, the processor 333 according to an embodiment may receive the first routine data 500 from the external server 320 and display it in a preview manner in a 'recommended' tab 911 (912 and 913). The processor 333 according to an embodiment may simply display content of the control condition information 510 and content of control operation information 530 of the first routine data 500 together with an icon.

In FIG. 9, an example in which a process of modifying the control condition information 510 of the first routine data 500 is displayed on the display 331 is shown in a screen 920. According to an embodiment, the processor 333 may simply display content of the gesture information 513 constituting the control condition information 510 and/or the information 515 obtained from the external recognition device together with an icon. Referring to the screen 920, the processor 333 according to an embodiment may add detailed content of the control condition information 510 in response to an input of selecting a plus icon 921, and may delete the detailed content of the control condition information 510 in response to an input of selecting a minus icon 922. The processor 333 may perform an operation (e.g., the operation 708 of FIG. 7) of modifying gesture information included in the control condition information 510 of the first routine data in response to a user input for the screen 920 of FIG. 9.

In FIG. 9, an example in which a process of modifying the control operation information 530 of the first routine data 500 displayed on the display 331 is shown in a screen 930. According to an embodiment, the processor 333 may simply display content of the control operation 533 constituting the control operation information 530 together with an icon. Referring to the screen 930, the processor 333 according to an embodiment may add detailed content of the control operation information 530 in response to an input of selecting a plus icon 931, and may delete the detailed content of the control operation information 530 in response to an input of selecting a minus icon 932. The processor 333 may perform an operation (e.g., the operation 808 of FIG. 8) of modifying control operation information of the first routine data in response to a user input for the screen 930 of FIG. 9.

In FIG. 9, an example in which first routine data modified through the operations 910 to 930 (e.g., second routine data) is displayed on the display 331 is shown in a screen 940.

Referring to the screen 940, the processor 333 according to an embodiment may display the modified first routine data in a 'my routines' tab 941 together with an icon (942). According to an embodiment, the processor 333 may control whether to activate the modified first routine data in response to an input of selecting an on/off icon 943.

According to an embodiment, the processor 333 may modify the first routine data 500 depending on a user configuration through the operations 910 to 940 of FIG. 9, and may process it into second routine data. A method in which the processor 333 outputs the process of modifying the first routine data 500 to the display 331 is not limited to the embodiment illustrated in FIG. 9 and various methods are possible.

Figure 10:
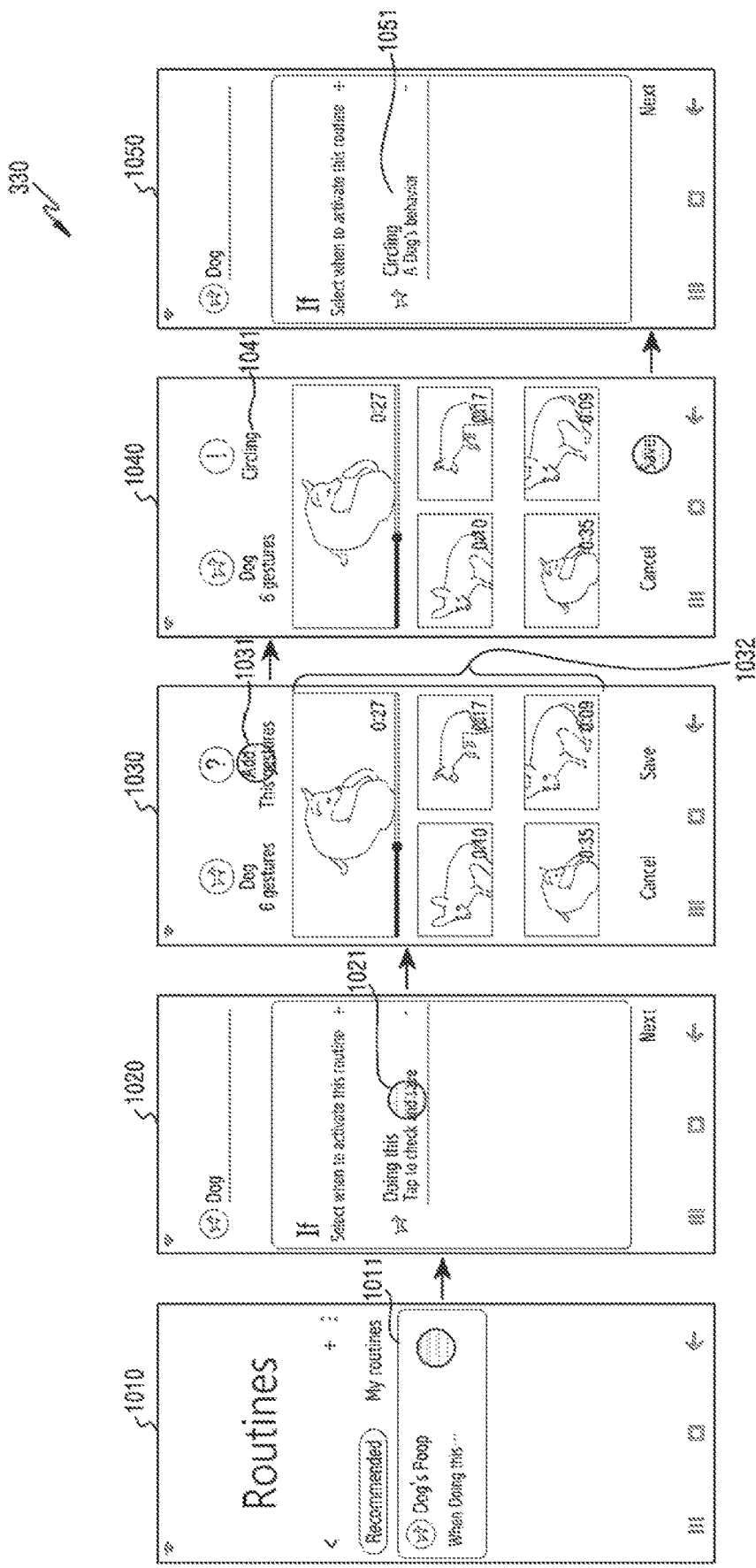
FIG. 10 is an example diagram illustrating a method of configuring gesture information in an electronic device according to an embodiment.

FIG. 10 is an example diagram illustrating a method of configuring the gesture information 513 in the electronic device 330 according to an embodiment. In FIG. 10, an example in which the information 515 obtained from the external recognition device is displayed on the display 331 is shown in a screen 1010, and an example in which the information 515 obtained from the external recognition device and constituting the control condition information 510 is displayed on the display 331 is shown in a screen 1020. Referring to the screen 1010, the processor 333 according to an embodiment may receive the information 515 obtained from the external recognition device and display it in a preview manner in a 'recommended' tab (1011). According to an embodiment, the processor 333 may simply display content of the information 515 obtained from the external recognition device together with an icon.

In FIG. 10, an example in which a process of configuring the gesture information 513 by analyzing the information 515 obtained from the external recognition device is displayed on the display 331 is shown in screens 1030 and 1040. Referring to the screen 1030, the processor 333 according to an embodiment may display video information 1032 of an object obtained from, in particular, a camera of the external recognition device 310, and may reproduce at least one video of the video information 1032 of the object and may delete unnecessary video. According to an embodiment, the processor 333 may configure the video information 1032 of the object as one gesture in response to an input of selecting a gesture add icon 1031, and may display the configured gesture (1041). For example, when motion information indicating that a puppy of the object is circling is obtained from the camera, the processor 333 may configure it as a circling gesture by collecting the obtained information.

In FIG. 10, an example in which gesture information configured through the operations 1010 to 1040 is displayed on the display 331 is shown in a screen 1050. For example, the processor 333 may simply display the configured gesture indicating that the puppy is circling together with an icon (1051). According to an embodiment, through the operations 1010 to 1050 of FIG. 10, the processor 333 may additionally configure new gesture information even if there is no pre-set gesture information 513 corresponding to the information 515 obtained from the external electronic device. A method in which the processor 333 outputs the process of configuring the gesture information 513 to the display 331 is not limited to the embodiment described in FIG. 10 and various methods are possible.

Figure 11:
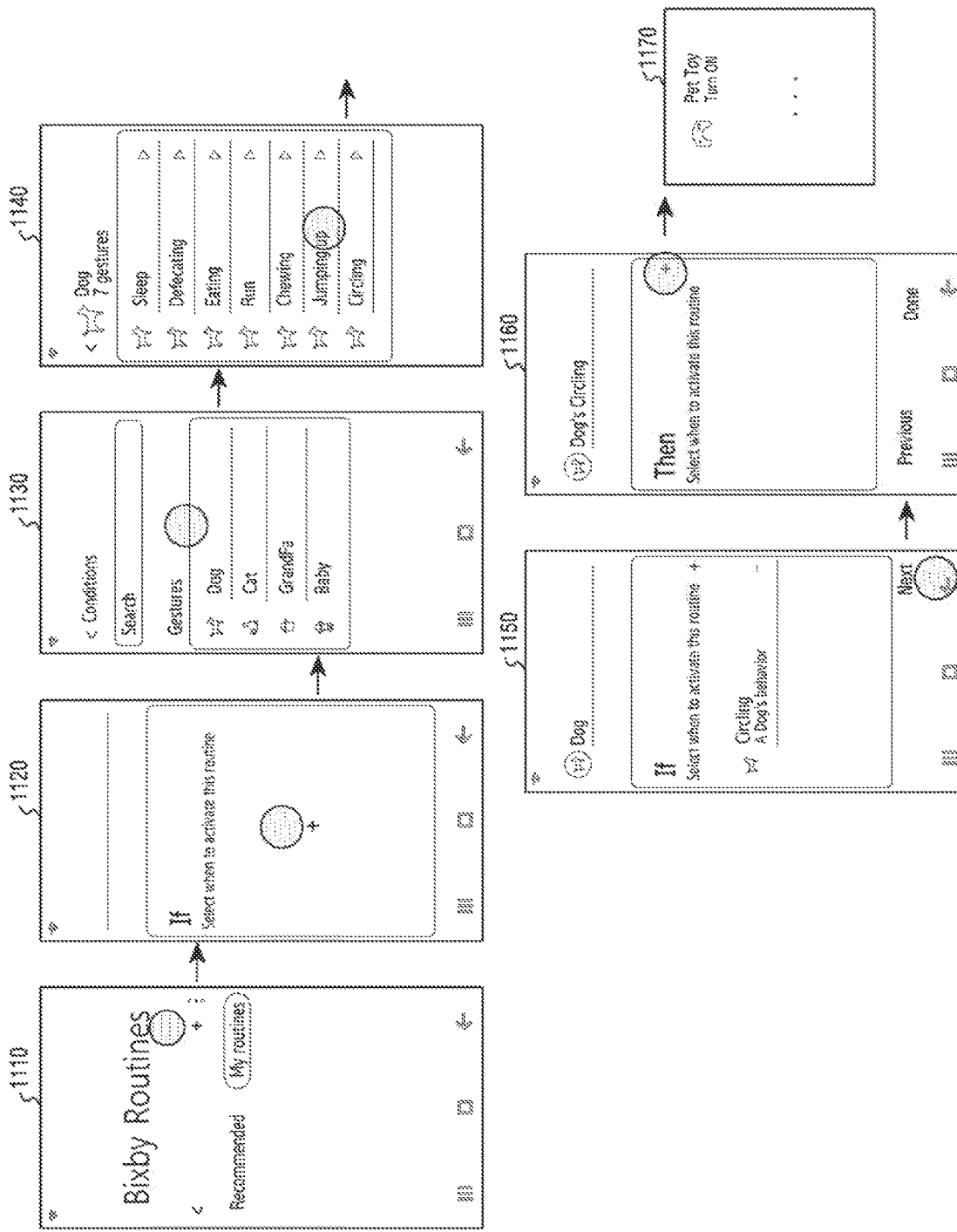
FIG. 11 is an example diagram illustrating a method of configuring second routine data depending on gesture information in an electronic device according to an embodiment.

FIG. 11 is an example diagram illustrating a method of configuring second routine data depending on the gesture information 513 in the electronic device 330 according to an embodiment. The processor 333 according to an embodiment may configure the second routine data in response to an input of selecting a plus icon in a screen 1110 of FIG. 11, and may configure control condition information of the second routine data in response to an input of selecting a plus icon in a screen 1120.

In FIG. 11, an example in which an object constituting the object information 511 is displayed on the display 331 is shown in a screen 1130, and an example in which the gesture information 513 of the object selected in the screen 11330 is displayed on the display 331 is shown in a screen 1140. An example in which the control condition information 510 corresponding to the gesture information selected in the screen 1140 is displayed on the display 331 is shown in a screen 1150. An example in which the control operation information 530 corresponding to the gesture information selected in the screen 1140 is displayed on the display 331 is shown in a screen 1160. The processor 333 according to an embodiment may add a control operation 533 for controlling the external electronic device in response to an input of selecting a plus icon in the screen 1160 of FIG. 11 (1170).

According to an embodiment, the processor 333 may modify or configure second routine data depending on a user configuration through the operations 1110 to 1170 of FIG. 11. A method in which the processor 333 outputs the process of modifying or configuring the second routine data to the display 331 is not limited to the embodiment illustrated in FIG. 11 and various methods are possible.

Figure 12:
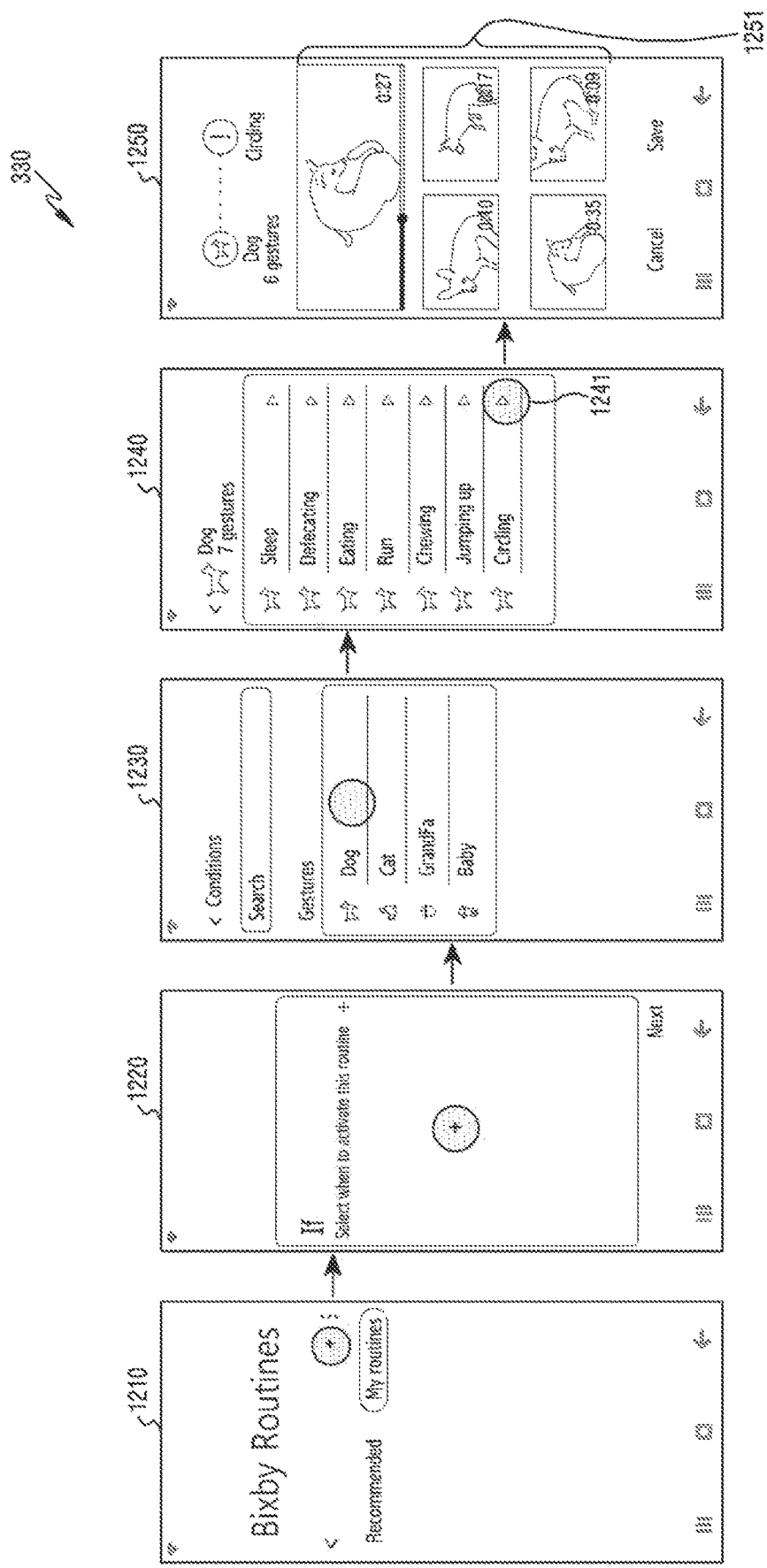
FIG. 12 is an example diagram illustrating a method of confirming gesture information configured in an electronic device according to an embodiment.

FIG. 12 is an example diagram illustrating a method of confirming gesture information configured in the electronic device 330 according to an embodiment. The processor 333 according to an embodiment may configure second routine data in response to an input of selecting a plus icon in a screen 1210 of FIG. 12. The processor 333 may configure control condition information of the second routine data in response to the input of selecting the plus icon in a screen 1220. In response to an input of selecting an object of an object list in a screen 1230, the processor 333 may display gesture information of an object selected in a screen 1240. In response to an input of selecting an arrow icon 1241 in the screen 1240, the processor 333 may display detailed content 1251 of a gesture in a screen 1250.

According to an embodiment, in the screen 1250 of FIG. 12, the processor 333 may display detailed information of the gesture configured depending on the user configuration in advance before configuring the second routine data. A method in which the processor 333 outputs the detailed information of the configured gesture to the display 331 is not limited the embodiment disclosed with reference to the screen 1250, and various methods are also possible.

Returning to FIG. 4, in operation 470, the processor 333 according to an embodiment may transmit to the external server 320 the second routing data including modified control condition information and modified control operation information. According to an embodiment, the second routine data including the modified control condition information and the modified control operation information may be stored in the memory 332 of the electronic device 330.

According to an embodiment, the external server 320 may collect, from at least one external recognition device, first data obtained by the at least external recognition device, analyze the collected first data to generate and store first routine data including control operation information indicating an operation of controlling at least one external electronic device and control condition information indicating a condition enabling the control operation information to be executed, transmit the stored first routine data to an electronic device, receive second routine data from the electronic device, and update the first routine data in response to the received second routine data.

According to an embodiment, the external server 320 may collect second data obtained by at least one external recognition device, and when the second data satisfies information obtained from the external recognition device and included in control condition information of the second routine data, may control at least one external electronic device, based on control operation information of the second routine data. When the disclosed second data satisfies information obtained from the external recognition device and included in the control condition information of the second routine data, this may be a case where the second data matches to per-object gesture information.

An example related to a server is described with reference to FIG. 13 to FIG. 15.

Figure 13:
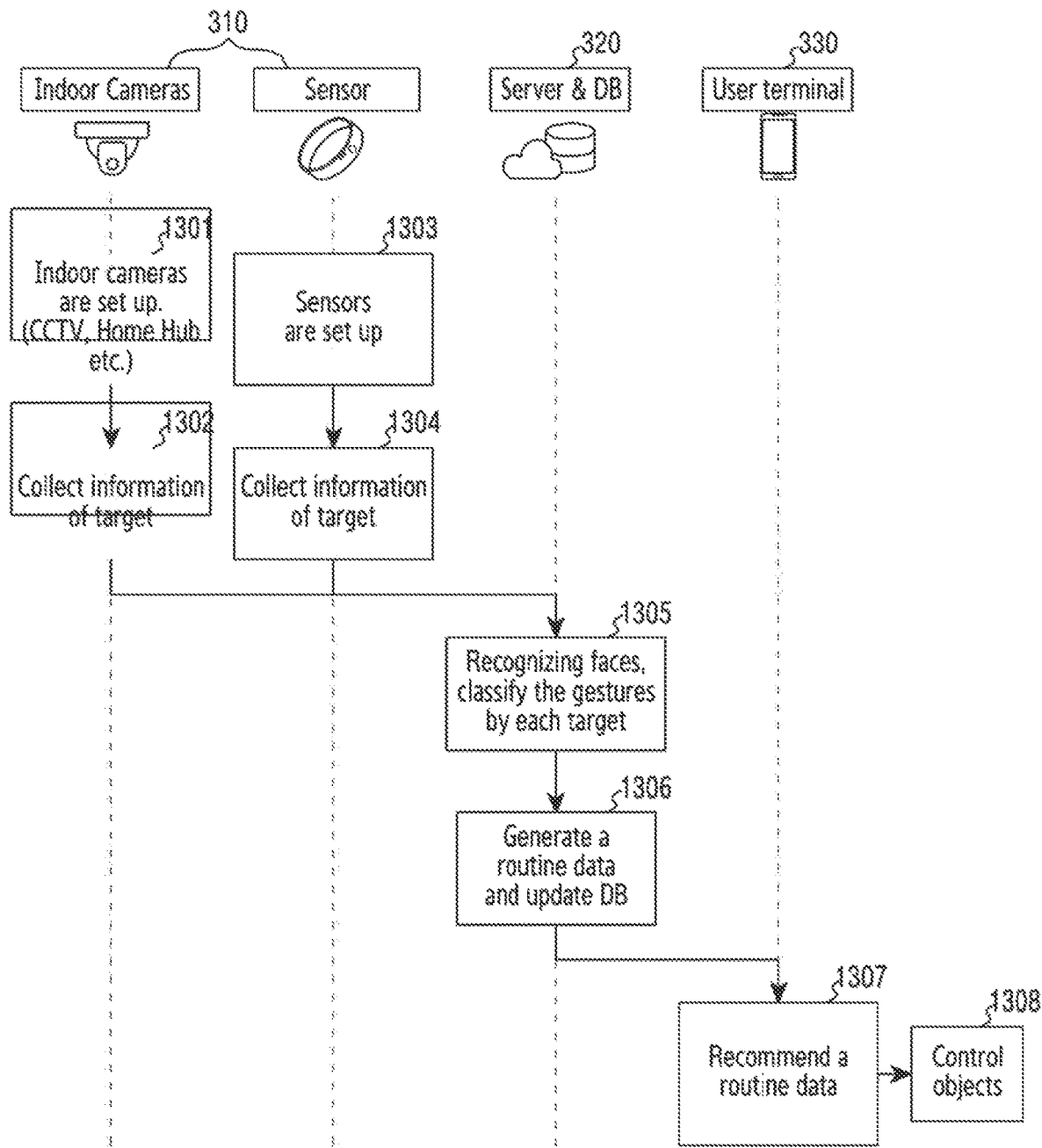
FIG. 13 is a schematic diagram illustrating a method of generating routine data in a server according to an embodiment.

FIG. 13 is a schematic diagram illustrating a method of generating routine data in a server (e.g., the external server 320 of FIG. 3) according to an embodiment. The method of FIG. 13 may be performed by the external server 320 of FIG. 3. Referring to FIG. 13, an indoor camera may be installed in the external recognition device 310 (1301). The camera may obtain information on an object (1302). A sensor may be installed in the external recognition device 310 (1303). The sensor may obtain information on an object (1304). The external server 320 may recognize an object from the obtained information to analyze per-object gesturer information (1305) and generate routine data (1306). The electronic device 330 may receive the routine data from the external server 320 (1307) and execute the routine data to control the external electronic device 340 (1308).

Figure 14:
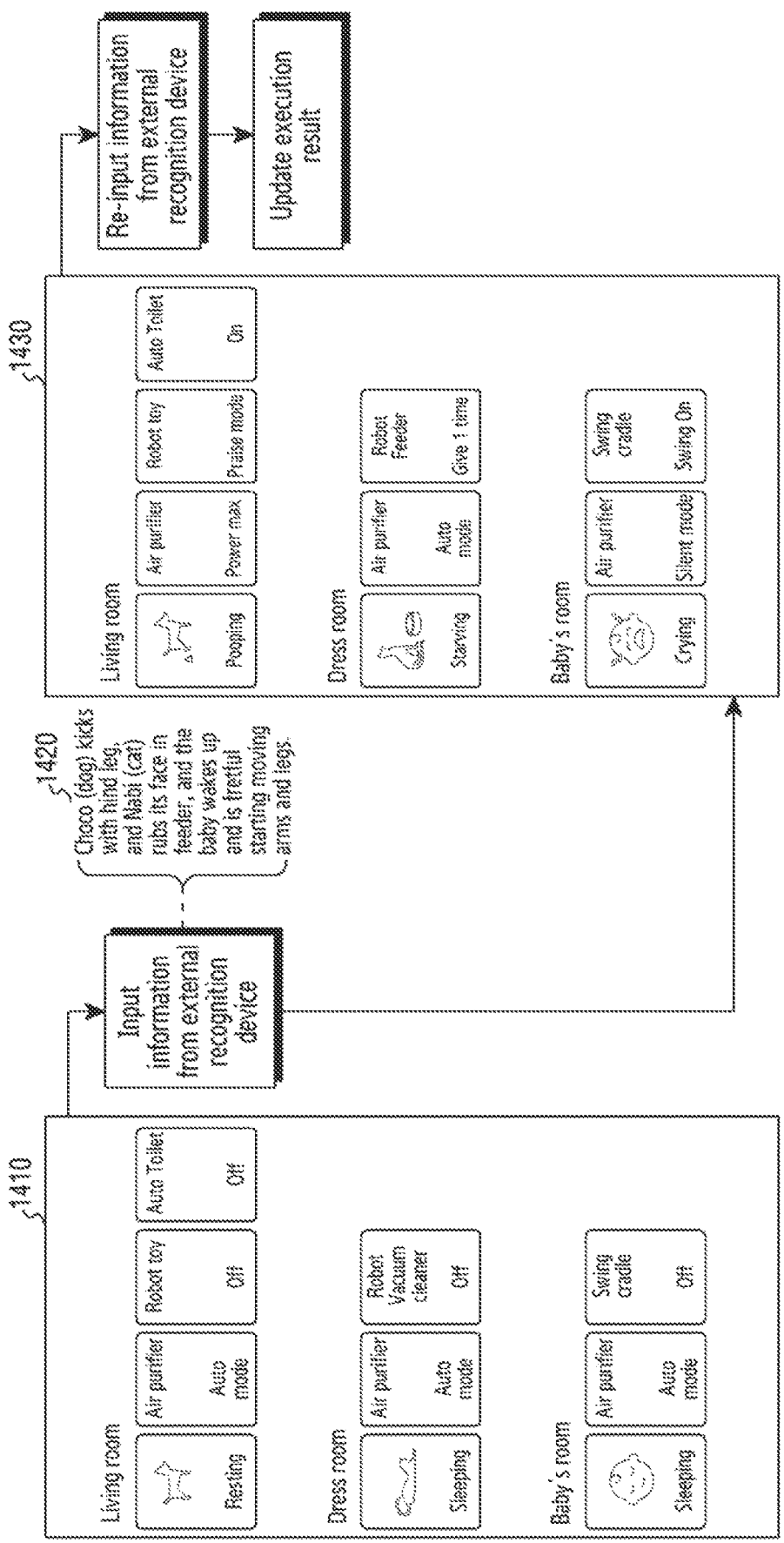
FIG. 14 is an example diagram illustrating a method of controlling an external electronic device, based on information obtained in an external recognition device, in a server according to an embodiment.

FIG. 14 is an example diagram illustrating a method of controlling an external electronic device, based on information obtained in an external recognition device, in a server (e.g., the external server 320 of FIG. 3) according to an embodiment. The method of FIG. 14 may be performed by the external server 320 or electronic device 330 of FIG. 3. In FIG. 14, an example in which a state of controlling the external electronic device 340 by executing routine data based on a gesture of an object is displayed on the display 331 is shown in a screen 1410. An example of data collected from the external recognition device 310 is shown in a screen 1420. An example in which a gesture of an object changed depending on the input of the screen 1420 and a control state of the external electronic device 340 are displayed on the display 331 is shown in a screen 1430.

Referring to FIG. 14, the external server 320 according to an embodiment may identify a gesture indicating that a puppy 'Choco' of a user is resting in a living room and perform a control operation, corresponding to a rest gesture, of the external electronic device (1410). When information obtained from the external recognition device and indicating that Choco kicks with a hind leg is input from the external recognition device (1420), a gesture indicating that Chocho is defecating may be identified to perform a control operation, corresponding to the identified gesture, of the external electronic device (1430). Through the aforementioned operations, the external server 320 may control an air purifier in the living room from an auto mode to a power max mode, control a robot toy from a power-off mode to a praise mode, and control an auto toilet from a power-off mode to a power-on mode.

Referring to FIG. 14, the external server 320 according to an embodiment may continuously receive the information 515 obtained from the external recognition device even after the operation 1430 and may determine whether the executed control operation 533 is satisfied from the input information. According to an embodiment, the external server 320 may determine whether there is a change in a gesture of an object or analyze an expression of the object to determine whether the executed control operation is satisfied. The external server 320 may update routine data by reflecting the determination on whether it is satisfied. For example, the external server 320 may modify at least one of the control operation and external electronic device information of routine data registered in the external server 320, based on whether it is satisfied, or may transmit to the electronic device a message for suggesting modification of the control operation.

Figure 15:
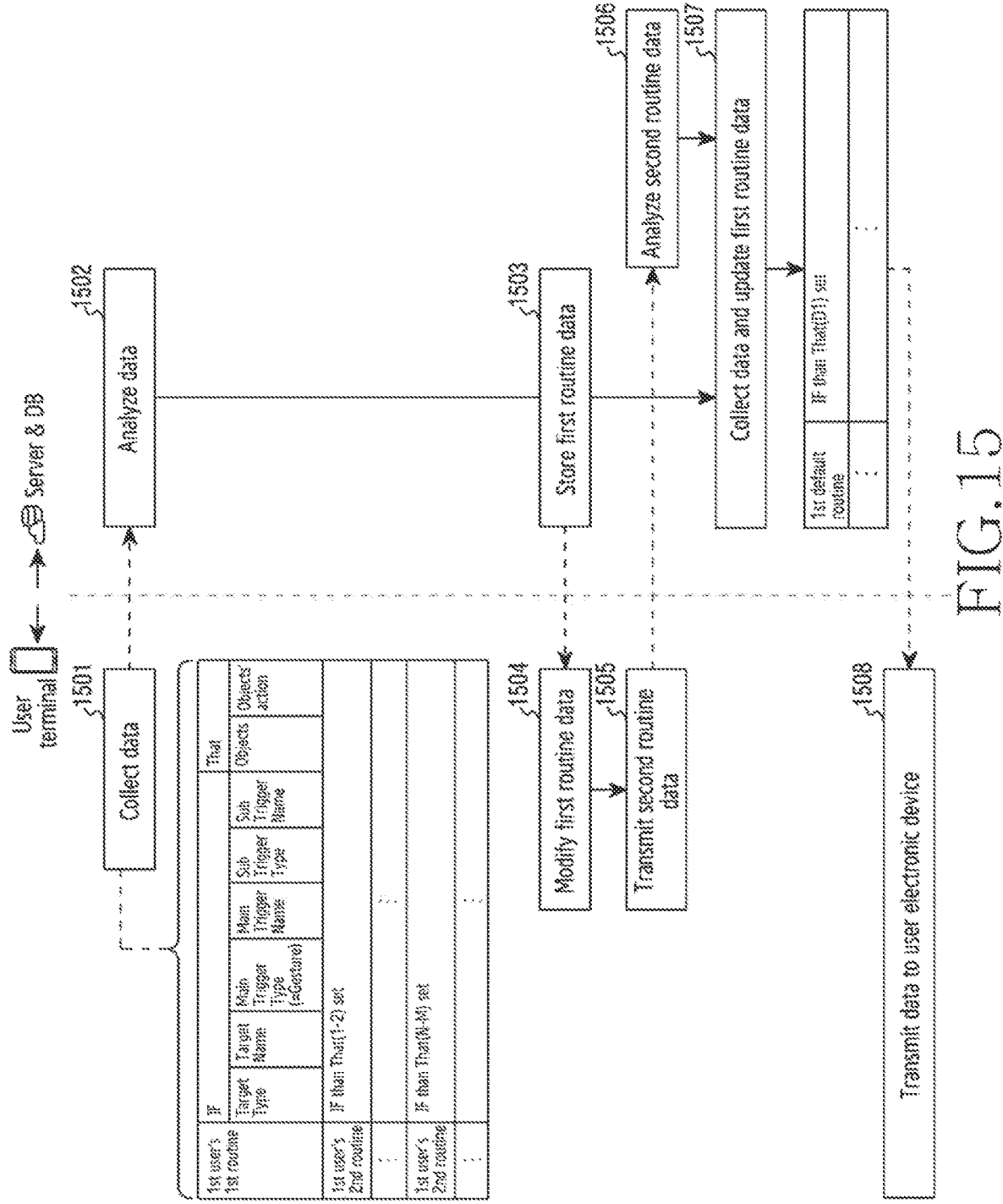
FIG. 15 is an example diagram illustrating a method of updating routine data in a server according to an embodiment.

FIG. 15 is an example diagram illustrating a method of updating routine data in a server (e.g., the external server 320) according to an embodiment. The method of FIG. 15 may be performed by the external server 320 of FIG. 3. Referring to FIG. 15, the external server 320 according to an embodiment may collect, from at least one external recognition device, first data obtained by the at least external recognition device (1501), analyze the collected first data (1502) to generate and store first routine data (1503), transmit the stored first routine data to an electronic device, modify the first routine data (1504), receive second routine data which is the modified first routine data from the electronic device (1505), analyze the received second routine data (1506), update the pre-stored first routine date (1507), and transmit again the updated routine data to the electronic device (1508). Through the operations 1501 to 1508 of FIG. 15, the external server 320 according to an embodiment may collect a great amount of data, and may persistently update the first routine data, thereby increasing accuracy of data analysis.

As described above, according to an embodiment, a method of controlling an external electronic device of an electronic device (e.g., the electronic device 101 of FIG. 1 or the electronic device 330 of FIG. 3) may include an operation (e.g., the operation 410 of FIG. 4) of receiving, from an external server, first routine data including control operation information indicating an operation of controlling at least one external electronic device and control condition information indicating a condition enabling the control operation information to be executed, an operation (e.g., the operation 430 of FIG. 4) of controlling a display to display the control condition information, and modifying the control condition information in response to a first user input regarding the displayed control condition information, an operation (e.g., the operation 450 of FIG. 4) of controlling the display to display the control operation information, and modifying the control operation information in response to a second user input regarding the displayed control operation information, and an operation (e.g., the operation 470 of FIG. 4) of transmitting to the external server, second routine data including the modified control condition information and the modified control operation information.

According to an embodiment, the control condition information (e.g., the control condition information 510 of FIG. 5) may include at least one of object information (e.g., the object information 511 of FIG. 5), per-object gesture information (e.g., the gesture information 513 of FIG. 5), and information obtained from an external recognition device (e.g., the information 515 obtained from the external recognition device of FIG. 5).

According to an embodiment, the information obtained through the external recognition device may include motion information of the object, voice information, location information, location-based motion information, and location-based voice information.

According to an embodiment, the first user input may include at least one of an input for adding or deleting the object and an input for modifying the per-object gesture information.

According to an embodiment, the first user input may include an input for configuring the per-object gesture information, based on an image.

According to an embodiment, the control operation information may include information consisting of a pair of information of the external electronic device and a control operation corresponding thereto for controlling the external electronic device.

According to an embodiment, the second user input may include at least one of an input for adding or deleting the external electronic device and an input for modifying the control operation of the external electronic device.

According to an embodiment, the method may further include an operation of storing second routine data including the modified control condition information and the modified control operation information in the electronic device.

As described above, according to an embodiment, a server (e.g., the server 108 of FIG. 1 or the external server 320 of FIG. 1) for storing and analyzing data is provided. The server may be configured to collect, from at least one external recognition device (e.g., the external recognition device 310 of FIG. 3), first data obtained by the at least external recognition device, analyze the collected first data to generate and store first routine data (e.g., the first routine data 500 of FIG. 5) including control operation information (e.g., the control operation information 530 of FIG. 5) indicating an operation of controlling at least one external electronic device and control condition information (e.g., the control condition information 510 of FIG. 5) indicating a condition enabling the control operation information to be executed, transmit the stored first routine data to an electronic device, receive second routine data from the electronic device, and update the first routine data in response to the received second routine data.

According to an embodiment, the control condition information may include at least one of object information (e.g., the object information 511 of FIG. 5), per-object gesture information (e.g., the gesture information 513 of FIG. 5), and information obtained from the external recognition device (e.g., the information 515 obtained from the external recognition device of FIG. 5).

According to an embodiment, the server may collect second data obtained by at least one external recognition device, and when the second data satisfies information obtained from the external recognition device and included in control condition information of the second routine data, may control at least one external electronic device, based on control operation information of the second routine data.

According to an embodiment, when the second data satisfies information obtained from the external recognition device and included in the control condition information of the second routine data, this may be a case where the second data matches to per-object gesture information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a communication circuit;
   a display;
   a memory storing instructions; and
   at least one processor configured to execute the instructions to:
   obtain, from an external server via the communication circuit, first routine data comprising control operation information indicating an operation of an external electronic device, and control condition information indicating a condition based on which the external electronic device executes the operation,
   control the display to display the control condition information, and modify the control condition information based on a first user input regarding the displayed control condition information,
   control the display to display the control operation information, and modify the control operation information based on a second user input regarding the displayed control operation information, and
   control the communication circuit to transmit, to the external server, second routine data including the modified control condition information and the modified control operation information,
   wherein the control condition information comprises at least one of object information, per-object gesture information, and information obtained from an external recognition device, and
   wherein the information obtained from the external recognition device comprises at least one of motion information of an object, voice information, location information, location-based motion information, and location-based voice information.

2. The electronic device of claim 1, wherein the first user input comprises at least one of an input for adding or deleting an object and an input for modifying the per-object gesture information.

3. The electronic device of claim 1, wherein the first user input comprises an input for configuring the per-object gesture information, based on an image.

4. The electronic device of claim 1, wherein the control operation information comprises information of the external electronic device and a control operation for controlling the external electronic device.

5. The electronic device of claim 4, wherein the second user input comprises at least one of an input for adding or deleting the external electronic device and an input for modifying the control operation.

6. The electronic device of claim 1, wherein the at least one processor is further configured to execute the instructions to store, in the memory, second routine data comprising the modified control condition information and the modified control operation information.

7. A method of controlling an external electronic device by an electronic device, the method comprising:
   receiving, from an external server, first routine data comprising control operation information indicating an operation of the external electronic device and control condition information indicating a condition based on which the external electronic device executes the operation;
   displaying on a display of the electronic device the control condition information, and modifying the control condition information based on a first user input regarding the displayed control condition information;
   displaying on the display the control operation information, and modifying the control operation information based on a second user input regarding the displayed control operation information; and
   transmitting to the external server, second routine data including the modified control condition information and the modified control operation information,
   wherein the control condition information comprises at least one of object information, per-object gesture information, and information obtained from an external recognition device, and
   wherein the information obtained from the external recognition device comprises at least one of motion information of an object, voice information, location information, location-based motion information, and location-based voice information.

8. The method of claim 7, wherein the first user input comprises at least one of an input for adding or deleting the object and an input for modifying the per-object gesture information.

9. The method of claim 7, wherein the first user input comprises an input for configuring the per-object gesture information, based on an image.

10. The method of claim 7, wherein the control operation information comprises information of the external electronic device and a control operation for controlling the external electronic device.

11. The method of claim 10, wherein the second user input comprises at least one of an input for adding or deleting the external electronic device and an input for modifying the control operation.

12. A server for storing and analyzing data, the server configured to:
   collect, from an external recognition device, first data obtained by the external recognition device;
   analyze the collected first data to generate and store first routine data comprising control operation information indicating an operation of an external electronic device and control condition information indicating a condition based on which the external electronic device execute the operation;
   transmit the stored first routine data to an electronic device;
   receive second routine data from the electronic device; and update the first routine data in response to the received second routine data, wherein the control condition information comprises at least one of object information, per-object gesture information, and information obtained from the external recognition device, and wherein the information obtained from the external recognition device comprises at least one of motion information of an object, voice information, location information, location-based motion information, and location-based voice information.

\* \* \* \* \*